United States Patent [19]

Arvidson et al.

[11] Patent Number: 5,232,052
[45] Date of Patent: Aug. 3, 1993

[54] APPARATUS AND METHOD FOR CONTROLLING THE INTRODUCTION OF CHEMICAL FOAMANT INTO A WATER STREAM IN FIRE-FIGHTING EQUIPMENT

[75] Inventors: Lawrence C. Arvidson, New Brighton; Robert S. Horeck, Fridley, both of Minn.

[73] Assignee: Hypro Corporation, New Brighton, Minn.

[21] Appl. No.: 15,003

[22] Filed: Feb. 9, 1993

[51] Int. Cl.⁵ .............................................. A62C 3/00
[52] U.S. Cl. ........................................ 169/14; 169/15; 169/44; 169/24
[58] Field of Search ................ 169/14, 15, 44, 24, 169/52

[56] References Cited

U.S. PATENT DOCUMENTS

| | | | |
|---|---|---|---|
| 4,209,258 | 6/1980 | Oakes | 417/43 |
| 4,234,007 | 11/1980 | Titone et al. | 137/101.19 |
| 4,246,969 | 1/1981 | McLouglin et al. | 169/13 |
| 4,324,294 | 4/1982 | McLoughlin et al. | 169/13 |
| 4,436,487 | 3/1984 | Purvis et al. | 169/13 X |
| 4,694,228 | 9/1987 | Michaelis | 318/341 |
| 4,751,439 | 6/1988 | Buchwald et al. | 318/305 |
| 4,795,314 | 1/1989 | Prybella et al. | 417/43 |
| 4,833,586 | 5/1989 | Inaba et al. | 363/4.1 |
| 4,899,825 | 2/1990 | Bosoni et al. | 169/14 |
| 4,983,891 | 1/1991 | Sekimoto | 318/66 |
| 5,156,005 | 10/1992 | Redlich | 318/811 |
| 5,174,383 | 12/1992 | Haugen et al. | 169/15 |

FOREIGN PATENT DOCUMENTS

| | | | |
|---|---|---|---|
| 40595 | 11/1981 | European Pat. Off. | 169/13 |
| 2946298 | 5/1981 | Fed. Rep. of Germany | 169/24 |
| 3817852 | 7/1989 | Fed. Rep. of Germany | 169/15 |
| 671819 | 7/1979 | U.S.S.R. | 169/13 |

Primary Examiner—David M. Mitchell
Assistant Examiner—James M. Kannofsky
Attorney, Agent, or Firm—Haugen and Nikolai

[57] ABSTRACT

A fire-fighting system in which a liquid chemical foamant is introduced into the water stream in varying amounts so as to maintain a predetermined percentage mixture irrespective of variations in the water flow includes a motor-driven pump where the motor is controlled over a first speed range by pulse width modulating the drive to the motor and over a second speed range, producing intermittent motion, by burst width modulating the drive signal when it is operating at its minimum pulse width modulated duty cycle. Using this technique the range of available motor speeds is extended well beyond that which can be achieved using pulse width modulation of the motor drive signal alone.

10 Claims, 7 Drawing Sheets

APPARATUS AND METHOD FOR CONTROLLING THE INTRODUCTION OF CHEMICAL FOAMANT INTO A WATER STREAM IN FIRE-FIGHTING EQUIPMENT

BACKGROUND OF THE INVENTION

I. Field of the Invention

This invention relates generally to a fire extinguishing system in which a calculated quantity of a liquid chemical foamant is introduced into the main water stream being directed at a fire, and more particularly to a microprocessor-based control system for such equipment in which the chemical foamant is introduced into the fluid into the water stream by a positive displacement pump driven by a DC motor that is energized by a pulse width modulated signal over a first range of speeds and by a fixed-width burst-modulated pulse width modulated signal over a second range of speeds.

II. Discussion of the Prior Art

In the Haugen et al. U.S. Pat. No. 5,174,383, assigned to applicant's assignee, there is described an apparatus and method for controlling the introduction of chemical foamant into a water stream in fire-fighting equipment. That system generally comprises a water supply arranged to deliver water at varying flow rates through a hose. Associated with the hose is a flow meter which produces an electrical signal proportional to the rate of water flow through the hose. The chemical foamant is contained within a supply tank and a positive displacement piston pump having an adjustable piston stroke is driven by a variable speed electric motor for pumping the chemical foamant from the supply tank into the water stream passing through the hose. A microprocessor-based controller receives the electrical signal from the flow meter as well as another signal proportional to pump speed and then computes the rate at which the electric motor driving the pump should be driven to introduce a metered quantity of the chemical foamant into the hose such that the percentage concentration of the foamant in the water remains at a preset value even though the water flow through the hose varies.

While the described system works well to introduce prescribed quantities of chemical foamant into the water stream so as to maintain a desired ratio of chemical foamant to water, it does so at the price of requiring a pump having an adjustable stroke so that both pump speed and stroke are adjustable parameters. It had heretofore not been possible to maintain a desired percentage of chemical foamant over the entire range of flows which are encountered in fire-fighting situations without having to shut down the system so that the pump stroke could be reset.

It has been demonstrated that Class A Foam is from five to ten times more effective as a fire suppressant than water alone. Utilizing foam, fires are extinguished faster and with substantially less water damage. Foam can be an effective barrier preventing fire from spreading and protecting adjacent structures. The chemical foamant, however, is not inexpensive. It is, therefore, desirable to have a foam injection system capable of automatically proportioning the foam in an exact concentration required for the specific fire-fighting problem, but without overusing and therefore wasting the chemical foamant. In that a positive displacement pump is used to inject the concentrate into the water stream, precise control must be maintained over the pump speed as the water flow varies if a preprogrammed concentration of liquid chemical foamant to water is to be maintained. Also, the motor driving the pump must have its speed controlled over a wide range, say, from 2600 rpm down to 400 rpm.

In accordance with the present invention, a DC motor is used to drive the pump and the speed of the motor is controlled over a first predetermined range using pulse width modulation of the DC signal driving the motor. The motor will thus operate at full rated speed when the duty cycle of the pulse width modulated drive signal is 100 percent. It has been found, however, that the motor when driving the multi-cylinder, positive displacement pump load tends to stall when the duty cycle of the pulse width modulated drive signal approaches about 30 percent. This corresponds to a 3:1 duty cycle ratio which translates to a speed ratio of about 12:1. This is too small a range to adequately proportion the chemical foamant into the water stream to maintain the desired proportion over the full range of flow rates. In accordance with the prior art Haugen et al. patent referenced above, accommodation was made by having a pump whose stroke volume can be varied. The mechanism used to vary the stroke volume, however, was difficult to adjust during normal operation of the foam proportioning system.

The present invention obviates this problem by effectively extending the speed ratio of the pump from about 12:1 to about 200:1.

It is accordingly a principal object of the present invention to provide an improved foam proportioning system for fire-fighting equipment.

Another object of the invention is to provide a control arrangement which greatly extends the speed range of the pump, making it unnecessary to adjust the pump's stroke volume to cover the desired range of flow rates encountered during the use of firefighting systems.

SUMMARY OF THE INVENTION

The fire-fighting system constructed in accordance with the present invention is of the type that includes a water supply means for normally delivering water at varying flow rates through a hose member, there being a flow meter device in the hose member for producing an electrical signal related to the rate of water flow through the hose. A liquid foam concentrate is provided in a supply tank and a positive displacement pump is arranged to pump the liquid chemical foamant concentrate from the tank and inject it into the hose member. The speed of the pump is sensed and fed back to a microprocessor-based controller connected to receive the electrical signal related to flow and that related to pump speed. The microprocessor then determines the speed at which the motor should be driven to introduce a metered quantity of the chemical foamant concentrate into the water stream passing through the hose which depends on the rate of flow of water through the hose. The output of the microprocessor-based controller is then fed to the pump drive motor in the form of a pulse-width modulated signal of a predetermined frequency whose duty cycle is determined by the computing means for varying the speed of the drive motor between a maximum corresponding to a 100% duty cycle and a lower intermediate speed which is slightly above the motor's stall speed. In accordance with the present invention, the low duty cycle pulse width modulated motor control signal is further burst width modulated so that the pulse width modulated signal is turned on and off at predetermined time intervals determined by the microprocessor for varying the speed allowed of the driven motor between the lower intermediate speed allowed by pulse width modulation and a predetermined minimum (intermittent stepped) speed whereby the flow rate of the liquid foam concentrate into the hose member is controllable over an extended range.

DESCRIPTION OF THE DRAWINGS

The foregoing objects, features and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
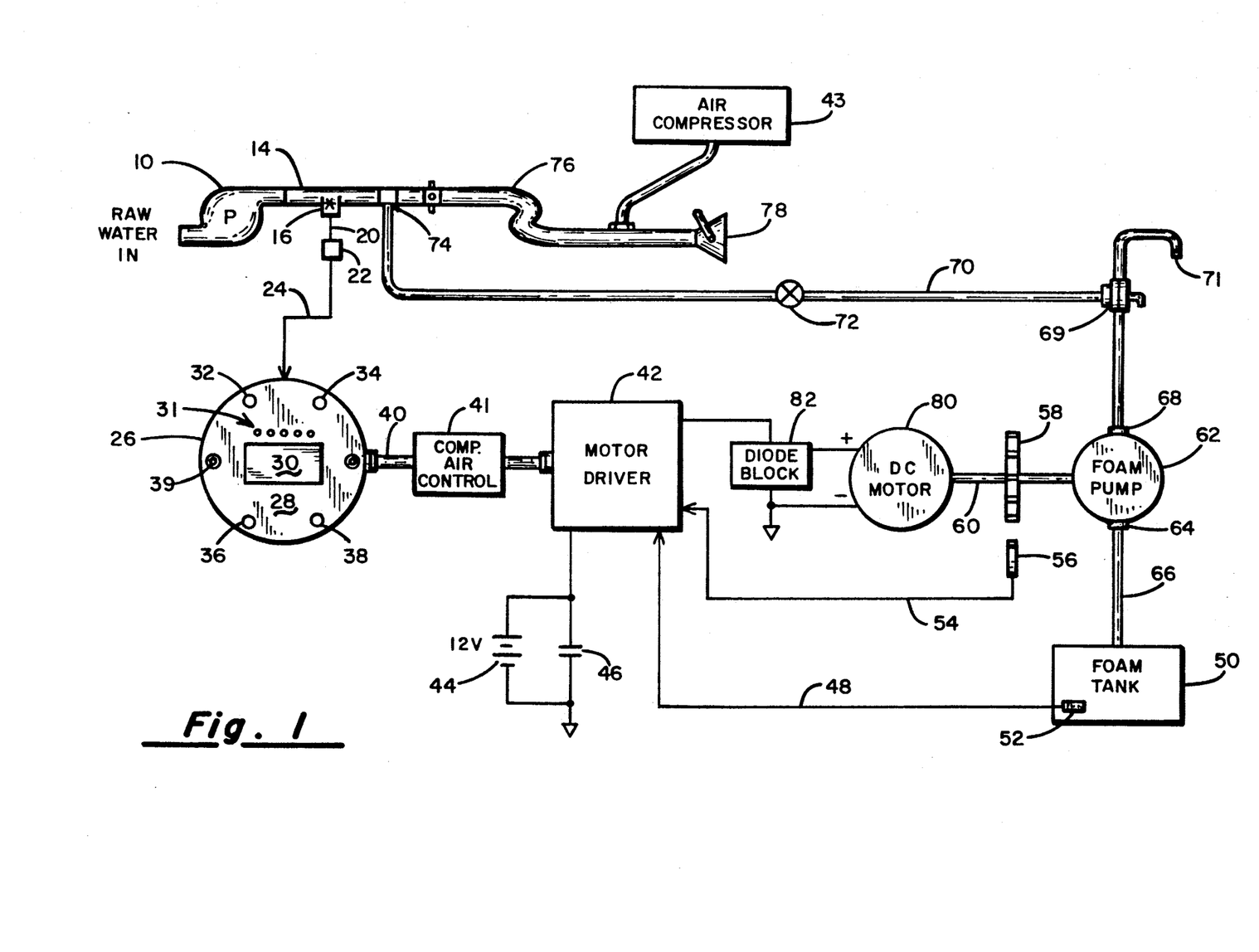
FIG. 1 is a schematic diagram of a fire extinguishing system constructed in accordance with the present invention.

The fire-fighting system of the present invention is illustrated schematically in FIG. 1 and is seen to include a conventional water pump 10 normally found on existing fire trucks. It is adapted to have its inlet 12 connected to a raw water supply and delivers water under pressure through a manifold 14 and a hose 76 having a variable flow nozzle 78 at its discharge end. Appropriately mounted in a fitting 16 associated with the manifold 14 is a flow meter 18 which delivers electrical signals over conductor 20 to a pulse forming circuit 22. The rate at which the pulse forming circuit 22 outputs pulses on conductor 24 is indicative of the volume rate of flow of water through the manifold 14.

The flow meter output signal is applied to a microprocessor-based controller contained within a computer and display module 26, only the face plate 28 of which can be seen in the view of FIG. 1. Visible on the face plate 28 is a display panel 30 which may typically comprise a five digit, 7-segment display of conventional design. Associated with each of a series of words stencilled on the face plate are discrete LED's identified by numeral 30. By this means, a particular operating mode can be identified by an illuminated one of the LEDs.

Also visible on the face plate 28 of the microprocessor/display module are a series of manually actuable push-buttons 32, 34, 36 and 38. Push-button 32 is a labeled on/off and is used to determine whether foam concentrate is to be injected into the water stream or not. Push-button 34 when repeatedly depressed and released causes a number of different functions to be displayed on the five-digit display screen 30. More particularly, the display may be made to operate so as to indicate whether the foam inject is on or off, the flow-per-minute of water or foam solution, the total amount of water or foam solution pumped subsequent to an earlier reset, the foam concentration injection rate setting in percent and the total amount of foam concentrate pumped. The value of concentrate pumped will be in the same unit of measurement as the water flow. Push-button 36 is a down arrow and when depressed, functions to decrease the value of the quantity then being displayed. Likewise, push-button 38 is an up arrow and is used to increase the quantity then being presented on the display. Another push-button is hidden from view behind a removable screw and is used to place the system in a setup or calibrate mode.

The circuitry in the display module is connected, via a five conductor cable 40 and an optional interlock module 41 to a motor driver circuit 42. When an air compressor as at 43 is employed to inject air into the nozzle to enhance the range of travel of the foam mixture being sprayed, it is essential that chemical foamant be present in the water stream. The interlock 41 functions to shut off the air compressor 43 in the event that the supply of chemical foamant concentrate is low or the pump used to inject it into the water stream is not functional. If compressed air is not used, the module 41 can be omitted, as will be explained with greater particularity below.

The motor driver circuit is arranged to be energized from the fire truck's 12 volt battery supply 44 having a storage capacitor 46 connected in parallel with it. Because the motor driver 42 in combination with the microprocessor-based controller comprise the heart of the present invention, the circuitry for implementing those devices will be explained in greater detail. Suffice it for now to say that in addition to the control received from the microprocessor controller display module, via cable 40, the motor driver 42 also receives a signal on line 48 indicative of the fact that the level of the foam concentrate in the foam tank 50 has fallen to a predetermined low level as determined by a float sensor 52. It also receives pulses on line 54 coming from a magnetic pickup 56 associated with a notched wheel 58 coupled to the drive shaft 60 of a positive displacement pump 62. The positive displacement pump 62 has its inlet 64 connected by a hose 66 to the foam tank and its outlet 68 is coupled by a hose 70 and a check valve 72 to an injector 74. Thus, when the pump is driven, it is effective to withdraw the foam concentrate from the tank 50 and inject it into the manifold 14 through which the raw water is pumped before exiting through one or more hoses 76 and ultimately out the nozzle 78.

The drive shaft 60 of the pump 62 is arranged to be driven by a DC motor 80 which receives its energization from the motor driver circuit 42 via diode block 82. The speed of the motor 80 is controlled using a pulse width modulated drive signal. As is well known in the art, the average current delivered to the motor is directly proportional to the duty cycle of the pulses used to drive the motor. Since the motor speed is directly related to the average motor current, by varying the duty cycle of the energization pulses, the effective rate of rotation of the pump shaft can be controlled.

Figure 2:
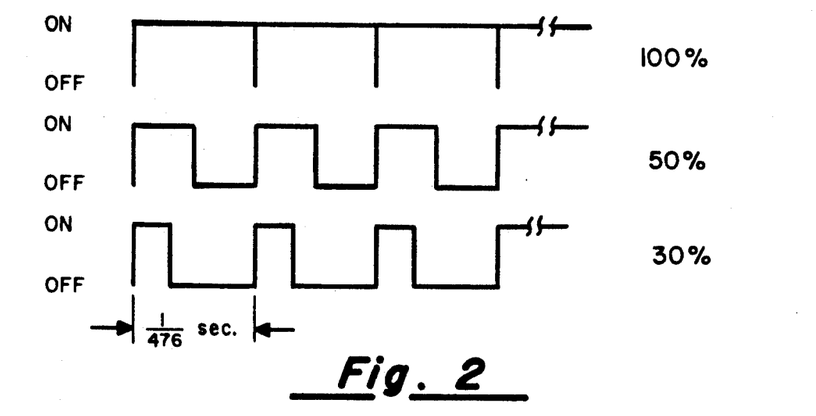
FIG. 2 shows a pulse width modulated motor drive signal of 100%, 50% and 30% duty cycle.

Referring to FIG. 2, there is depicted a series of pulse width modulated waveforms of differing duty cycle labeled 100 percent, 50 percent and 30 percent. The pulse repetition rate used in the system of the present invention was chosen to be 476 Hz, but limitation to that frequency is not to be inferred. With a 100 percent duty cycle, the average motor current may be the full rated current, but with a 50 percent duty cycle, the average motor current will only be one-half of the rated value. Likewise, with a 30 percent duty cycle, the average motor current will be approximately 30 percent of its full rated value. In that the system of the present invention is a flow-based proportioning system that measures water flow and then operates to inject the appropriate amount of foam concentrate to maintain a pre-set percentage, a speed range, greater than that which can be achieved using pulse width modulation control only, is required.

Figure 3:
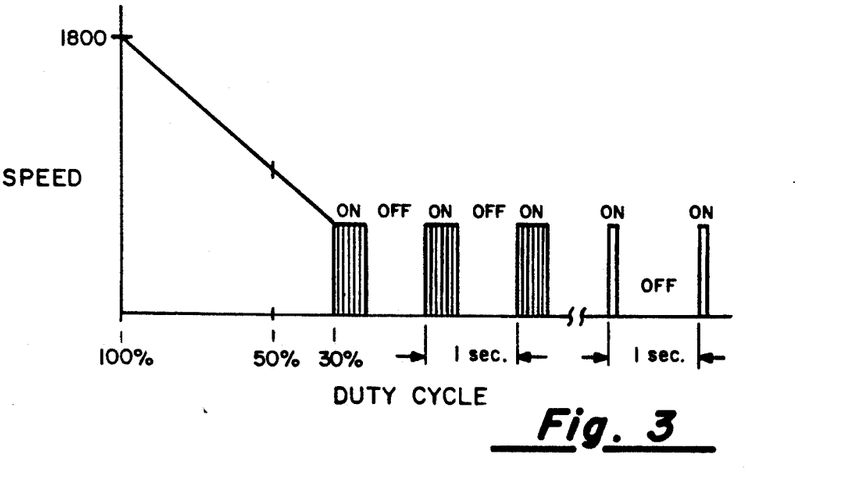
FIG. 3 is a graph illustrating the speed versus duty cycle characteristics of the chemical foamant pump motor when operated in accordance with the present invention.

In accordance with the present invention, a technique referred to as burst width modulation is used in conjunction with the pulse width modulated motor drive signal. Referring to FIG. 3, there is indicated a plot of pump speed versus duty cycle and, as indicated, for a 100 percent duty cycle, the pump speed may be, for example, 1,800 rpm. As the duty cycle decreases from its 100 percent value to the 30 percent value, the speed likewise decreases. On reaching the minimum duty cycle value attainable using pulse width modulation, the microprocessor begins switching the 475 Hz 30 percent pulse width modulated signal on and off at a rate which will permit the motor, and therefore the positive displacement pump which it drives, to be driven intermittently with the degree of rotation being determined by the amount of time that the 30 percent duty cycle 476 Hz signal is on during a predetermined time interval. In this fashion, the system of the present invention is capable of maintaining a desired concentration of liquid chemical foamant in the water stream over a wide range of flows from, say, 2,000 gallons per minute down to 10 gallons per minute.

Figure 4:
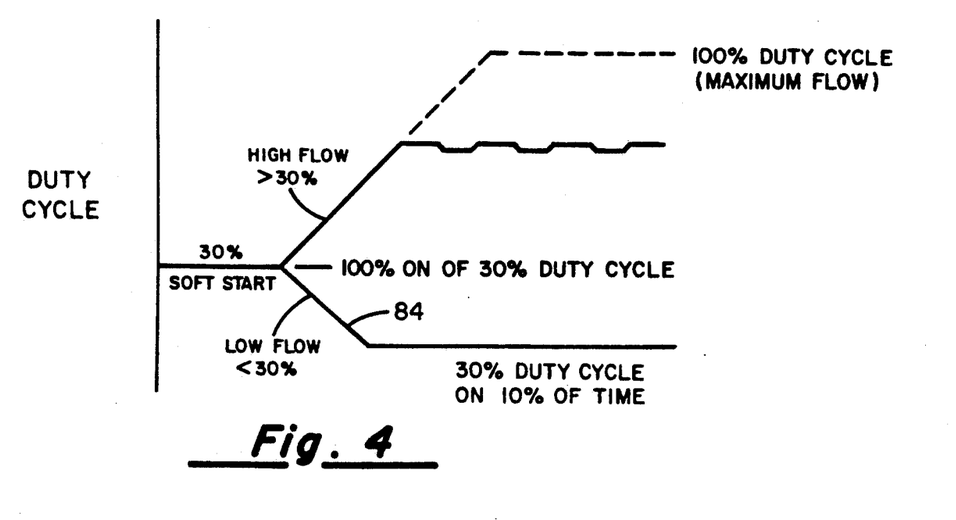
FIG. 4 is a graph of duty cycle variations for varying water flow conditions.

FIG. 4 is another graph which is helpful in explaining the motor control algorithm embodied in the present invention. To minimize the starting current drawn by the motor, the microprocessor is programmed to insure that it will operate in a "SOFT-START" mode where the duty cycle of the pulse width modulated drive is at about 30 percent at start-up. Following the soft-start, the microprocessor continuously samples pump speed and water flow rate and performs a computation to determine what the duty cycle should be in order for the pump to deliver chemical foamant to the line in an amount which will insure a preset concentration of chemical foamant in the water. With high flow rates, the duty cycle will be greater than 30 percent, such that the motor speed is proportional to the computed duty cycle. If, on the other hand, the water flow rate is low, such that the pump motor would have to be driven by a pulse width modulated signal less than 30 percent, which, as mentioned, is about the minimum that the motor can run without stalling, the microprocessor causes operation to switch to the burst width modulated mode such that the motor will be driven in step-wise fashion or intermittently. The downward sloping curve 84 in FIG. 3 is representative of operation in the burst width modulated mode where a 30 percent duty cycle pulse width modulated signal is on 10 percent of the time and off 90 percent of the time during a given interval. Thus, when the pump motor is being controlled in accordance with the present invention, precise metered quantities of a liquid chemical foamant, concentrate ranging from up to three gallons a minute down to a mere trickle, can be achieved. Because of the length of the hose 76 and the somewhat turbulent flow of water therethrough, even pulsatile injection of liquid chemical foamant into the waterline effectively blends with the water such that a foamed water stream of relatively uniform characteristics exits the nozzle 78.

Figure 5:
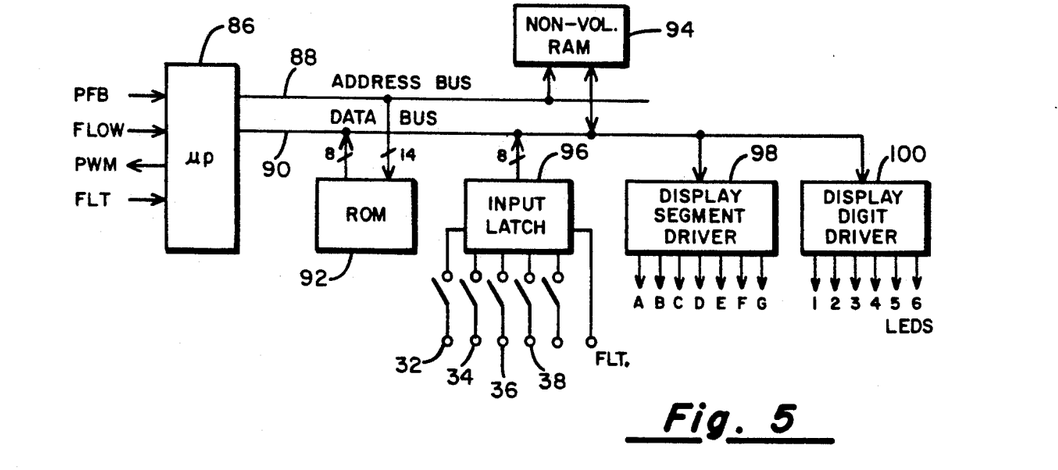
FIG. 5 is a schematic diagram of the microprocessor and associated memory and display drivers forming a part of the system of FIG. 1.

Referring now to FIG. 5, there is illustrated the circuitry contained within the microprocessor based controller/display module 26. It includes a microprocessor chip 86 which may preferably be a CMOS 8-bit processor sold by Intel Corporation as its Type 80C51FA. Associated with the microprocessor is an address bus 88 and a data bus 90. Appropriately coupled to the address bus and the data bus is a 128K ROM 92 that stores the program information and a non-volatile RAM 94 used to store operands and other parameters entered by the operator at the time of setup and initialization. For example, at the time of start-up, it is necessary to calibrate the flow meter and the pump and this calibration data is typically stored in the non-volatile RAM 94. Then, in the event of system shut-off or power failure, the previously stored contents are not lost.

Shown attached to the data bus is an input latch 96 for storing data entered via the keyboard push-buttons 32, 34, 36 and 38 shown in FIG. 1. Another input to the latch 96 comes from the float 52 which senses the level of the liquid chemical foam concentrate in the tank 50.

Finally, display drivers, including a segment driver 98 and a digit driver 100, are tied to the data bus. The outputs from the display segment driver 98 go to a conventional multi-digit, seven-segment display for creating alpha/numeric symbols and words which become visible to the operator. It is to be noted that the discrete LEDs 31 (FIG. 1) are treated as a sixth digit as far as multiplexing of digit drive signals is concerned. The seven-segment display devices are preferably of the aluminum gallium arsenide-type so that they produce a bright illumination capable of being read in direct sunlight.

Figure 6:
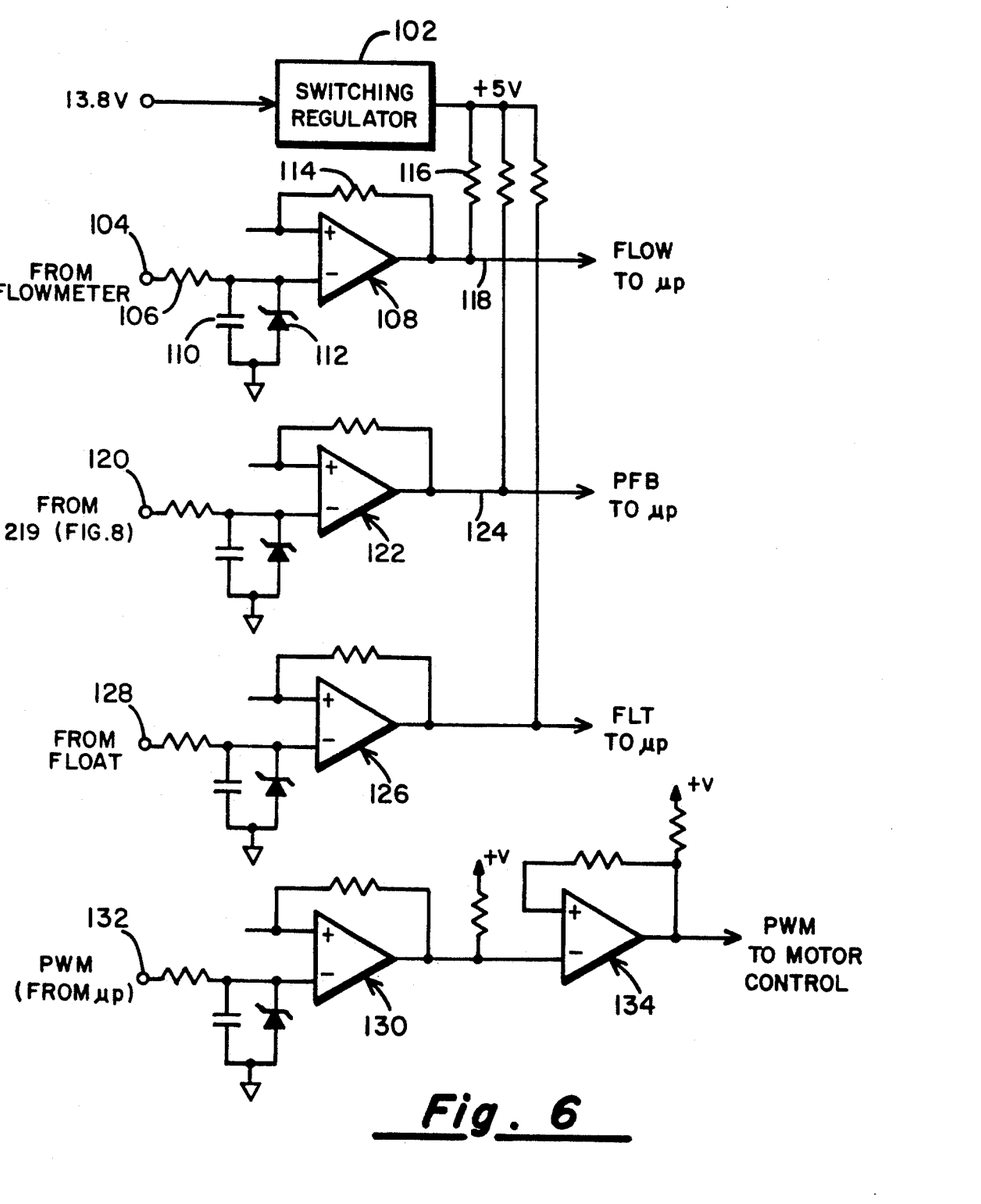
FIG. 6 illustrates the motor control board forming a part of the motor driver assembly of FIG. 1.

FIG. 6 is a circuit diagram of the pulse shaping circuitry used to receive pulse signals from the flow meter 18, the pump speed sensor 56, 58 and from the float 52 for converting them to a logic level suitable for application to the corresponding inputs to the microprocessor 86 (FIG. 5). The DC output voltage from a fire-fighting vehicle is typically about 13.8 volts and it is applied to a switching regulator-type DC-to-DC converter 102 which operates to produce a regulated 5 volt DC signal at its output.

The signal from the flow meter is applied, via terminal 104 and a current limiting resistor 106, to the inverting input of an operational amplifier 108 that is configured as a comparator. A capacitor 110 and a Zenar diode 112 function as a filter while the feedback resistor 114 establishes the threshold for comparison. A pull-up resistor 116 is connected between the output line 118 of the circuit such that as the flow meter device produces pulses, they will be converted to digital signals operating between ground and +5 volts.

In an identical fashion, the signal input originating at the pump speed sensor is applied to terminal 120 and the op amp circuit 122 conditions the pulsatile signal to one suitable for application to the microprocessor. This signal appears on line 124 identified by the acronym PFB standing for "Pump Feed Back".

The op amp comparator/receiver circuit 126 receives as its input to terminal 128 a signal level shift when the float indicates that the level of liquid foamant in the tank 50 has fallen to a preset threshold. Again, the receiver circuit 126 acts on this signal to produce a binary pulse that is compatible with the microprocessor 86.

Located at the bottom of FIG. 6 is a receiver circuit 130 that is substantially identical to the receiver circuits previously described. It receives at its input terminal 132 the pulse width modulation (PWM) signal from the microprocessor and conditions that signal, via driver circuit 134, to a signal level compatible with the motor driver circuitry depicted in FIG. 7.

Figure 7:
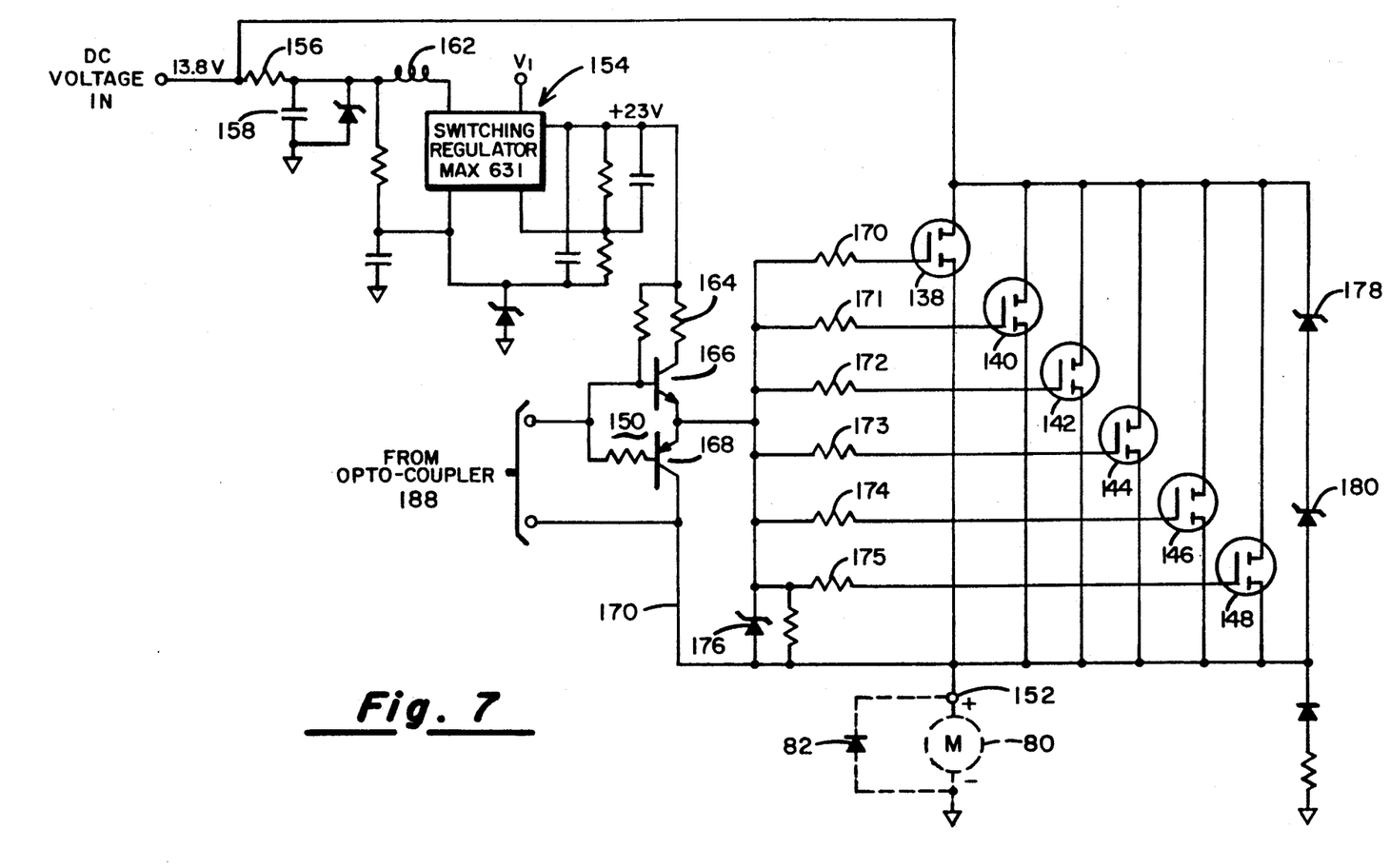
FIG. 7 is a schematic diagram of the motor driver board.

Referring to FIG. 7, the motor driver circuitry is comprised of two basic sections, namely, a power supply section, shown enclosed by the broken line box 136, and the MOSFET switching circuit used to apply the motor current to the pump drive motor 80. The power supply section 136 is used to boost the 13.8 volt fire truck alternator voltage to a 23 volt signal used to drive the gates on the six parallel connected MOSFET switches 138, 140, 142, 144, 146 and 148. The six MOSFET switches are arranged to be driven off and on in unison by a transistor push-pull driver 150.

It is necessary for the power supply 136 to boost the DC operating voltage to 23 volts because the motor drive circuit incorporates N channel MOSFETS which require a voltage that is up to 10 volts above the voltage at the low side of the driver block. The MOSFET switches are connected between the power source and the motor and when the motor is not energized, terminal 152 to which the motor is connected is at ground potential. When the motor is running, the voltage at terminal 152 is about 12 volts.

Referring to the power supply section 136, it comprises a DC-to-DC step-up converter which generates the 23 volt signal which is about 10 volts above the incoming power. When the up converter 154 is turned on, it tends to draw a heavy current such that a current limiting resistor 1156 is employed. The capacitor 158, connected as shown, functions as a filter. The Zenar diode 160 in parallel with that capacitor acts as a transient surge suppressor to protect the circuitry comprising the switching regulator 1541. The switching regulator functions in a conventional fashion to turn the current flowing through the inductor 1162 on and off to thereby generate a voltage proportional to the rate of change of current flowing through the inductor. The switching regulator 154 then operates on this voltage to yield a regulated DC voltage of the desired 2? volt amplitude.

The power supply 136 has its output connected, via a resistor 164, to the collector electrode of a NPN transistor 166, the emitter of which is connected to the emitter of a PNP transistor 1681. The collector electrode of transistor 168 is connected to the bus 170 leading to the motor input terminal 152. The common collectors of the transistors 1166 and 168 connect to the gate electrodes of each of the MOSFET switches 138-148, via gate resistors 170-175 which function as current limiters. The Zenar diode 176 is included to prevent gate punch through due to inordinately high voltages resulting from electromagnetic interference or the like. Likewise, diodes 178 and 180 are also included to provide a degree of transient protection.

Figure 8:
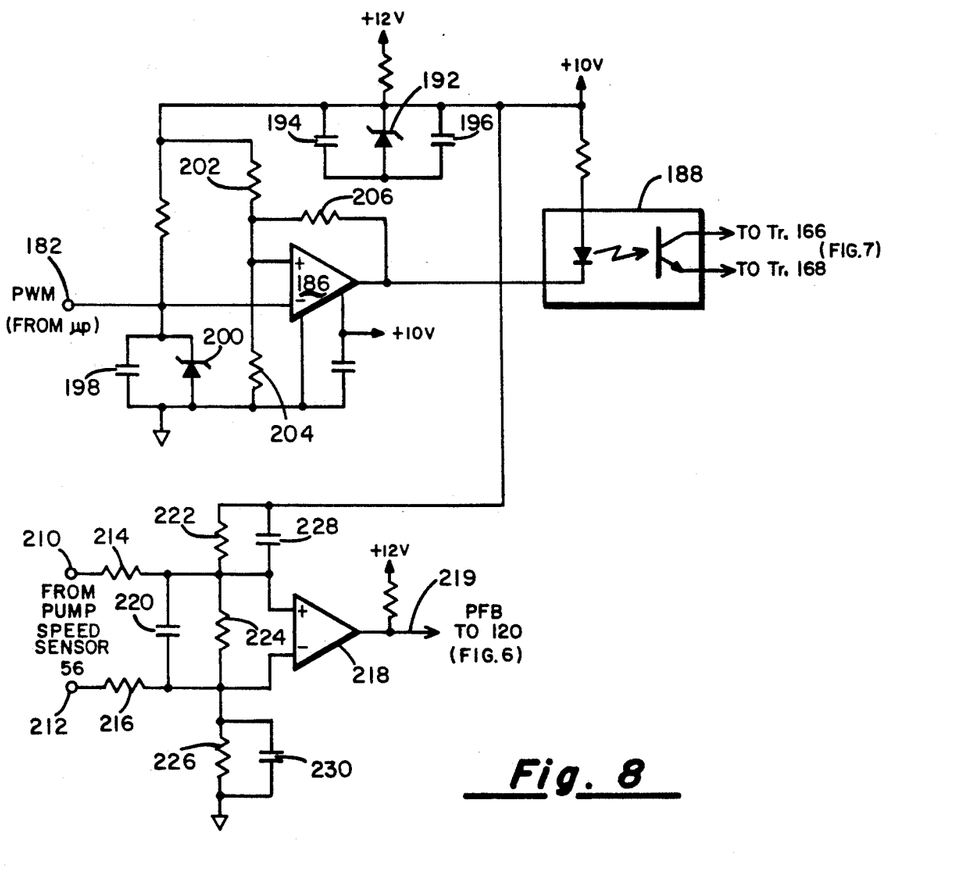
FIG. 8 is a schematic electrical diagram of the interface board used in the system of FIG. 1.

Turning now to FIG. 8, the manner in which the push-pull transistor driver circuit 150 is operated will next be described. The PWM signal from the driver 134 is a 12-volt pulse train running at 476 Hz. It is applied, via input resistor 1841, to the inverting input of an op amp 186. It is used to drive an optical coupler 188 which effectively isolates the outputs from the phototransistor half of the optical coupler. One electrode of the photo-emitter half of the optical coupler is connected through a resistor 190 to a 10 volt supply, which includes a Zenar diode 192 having filter capacitors 194 and 196 connected in parallel with it. The other electrode of the photo emitter in the optical coupler 184 is tied to the output of op amp 186 and, thus, the isolated output varies in accordance with the PWM signal applied to terminal 182 from the microprocessor.

The components, including capacitor 198 and the diode 200 which are connected between the inverting input of op amp 186 and ground, function as a filter and clamp which operates to clamp the positive excursions at the op amp's input to about 10 volts and the negative excursions to about 0.7 volts. The non-inverting input of the op amp 186 is biased at approximately half the power supply voltage by the voltage divider including resistors 202 and 204 of equal ohmic value. The feedback resistor 206 is included to prevent oscillation.

As indicated earlier, the op amp 186 drives an optical coupler which, in turn, drives the push-button transistors 150 on FIG. 7. Transistor 166 functions to turn on the MOSFET switches 138 through 148, while transistor 168, when driven into conduction, turns off the MOSFET switches. The six MOSFET switches in parallel will share the motor current equally, thus avoiding the overloading of any one switch.

Referring again to FIG. 8, the circuit for providing the pump speed feedback signal to the microprocessor will now be explained. As is illustrated in FIG. 1, a notched wheel 58 is affixed to the pump shaft to rotate with it and positioned in close, but non-contact relationship to the wheel 58 is an inductive pickup. As the teeth on the wheel 58 move at some velocity across the pole face of the pickup, a voltage is induced in the pickup 56 and this signal is applied across the terminals 210 and 212. A resistor 214 is connected between the terminal 210 and the non-inverting input of a comparator circuit including op amp 218. Likewise, a resistor 2116 is connected in series between input terminal 2112 and the inverting input of the op amp 218. The resistors 214 and 2116 along with the capacitor 220 function as a low-pass filter. A resistive voltage divider including resistors 222, 224 and 226 tend to bias the comparator 218 at approximately one-half of the 10 volt supply voltage in that resistors 222 and 226 are made to be of equal ohmic value. Capacitors 228 and 230 are included to produce further filtering. The two differential inputs 210 and 2112 are thus biased a few millivolts apart by a voltage drop across resistor 224. The op amp comparator 218 runs open loop and, therefore, the voltage difference required to change the output from one state to another can be quite small. When the voltage applied to terminal 212 is below the voltage present at terminal 210, the output from the differential input comparator 218 will be at its negative saturation limit. As soon as the voltage signal on terminal 212 rises higher than that on terminal 2110, the amplifier output flips to the positive saturation limit. Thus, the circuit acts as a signal conditioner for adapting the pump feedback (PFB) signal to one that can be applied to the corresponding PFB input of the microprocessor 86 in FIG. 5.

OPERATION

1. Calibration

As mentioned above, the system of the present invention is a flow-based proportioning system that continually measures the water flowing through the manifold 114 using a flow meter, such as the paddle wheel-type identified by numeral 16 in FIG. 1. The foam pump 62 is then operated in a controlled fashion to inject the proportional amount of foam concentrate from the storage tank 50 into the manifold 14 on the discharge side of the pump 10. The resulting foam solution is emitted from a standard fog nozzle, an air aspirated nozzle or compressed air foam system (CAFS) equipment by the main fire truck pump 10. At the time of initial installation, a calibration procedure must be followed to assure accurate operation. The calibration process makes adjustments to the flow meter and the foam pump display readings and can be done using any unit of measurement, i.e., U.S., metric, imperial, etc. The only requirement is that the same unit of measure be used throughout the calibration process to insure proper proportioning by the system.

Calibration and setup is done using the digital display 30 and the associated push-buttons 32, 34, 36 and 38 as well as a further push-button switch which is normally hidden from view behind a cover screw. Once this screw is removed, access can be had to the push-button switch using a probe that will fit through the threaded opening. The calibration mode is entered by depressing this hidden switch. It will cause the display to exhibit "Setup" until one of the other function push-buttons is depressed. The calibration mode is exited by again depressing the hidden switch.

It is critical that an accurate flow measuring standard be used to measure the water flow to calibrate the flow meter used in the present system. For example, a suitable smooth bore nozzle and an accurate pitot gauge-type instrument may be used. That gauge is used to determine the quantity per minute of water flow normally expected in the use of the system in fighting fires. The select button 34 is then depressed and the flow indicating LED will be illuminated. Now, by pressing either the up arrow button 36 or the down arrow button 38, the reading can be set to match the actual flow indicated by the pitot gauge reading.

To calibrate the foam pump, the same technique is used to enter the SETUP mode. The push-button 34 is then pressed to select the "total foam" entry on the digital display control module 26. The calibrate/inject valve 69 is turned to its "calibrate" position and a graduated container is disposed beneath the outlet 71. The "ON" button 32 is then depressed, causing the motor 80 to drive the foam pump 62 at a predetermined speed. It will pump the foam concentrate into the measuring container. When the foam level in the container reaches a measured amount (in any units), button 32 is again depressed to shut off the pump. Now, the up arrow or down arrow buttons 36 or 38 are used to bring the displayed reading equal to the measured quantity. The SETUP mode can now be exited by depressing the push-button switch used to initiate the SETUP mode and the cover screw 39 may be replaced. Exiting the SETUP mode causes the calibration constants to be stored in the non-volatile RAM memory 94 (FIG. 5).

Two types of foams are commonly used in fire-fighting applications. So-called "Class A" foam is used for most solid combustible materials, including grass, wood, fabric, etc. "Class B" foam is effective in fighting fires involving combustible liquid, such as gasoline, oil, etc. The preferred ratio of Class A foam to water is typically about 0.5 percent whereas the ratio for Class B foam is in the range of from 1 to 3 percent. The system of the present invention allows simple adjustment of the percentage. The "Select" button 34 is repeatedly actuated until the LED 31 associated with the "%" decal on the display face is illuminated. Now, using the up or down arrow buttons 36 and 38, the desired injection rate in percent can be adjusted.

2. General Operation

Figure 9:
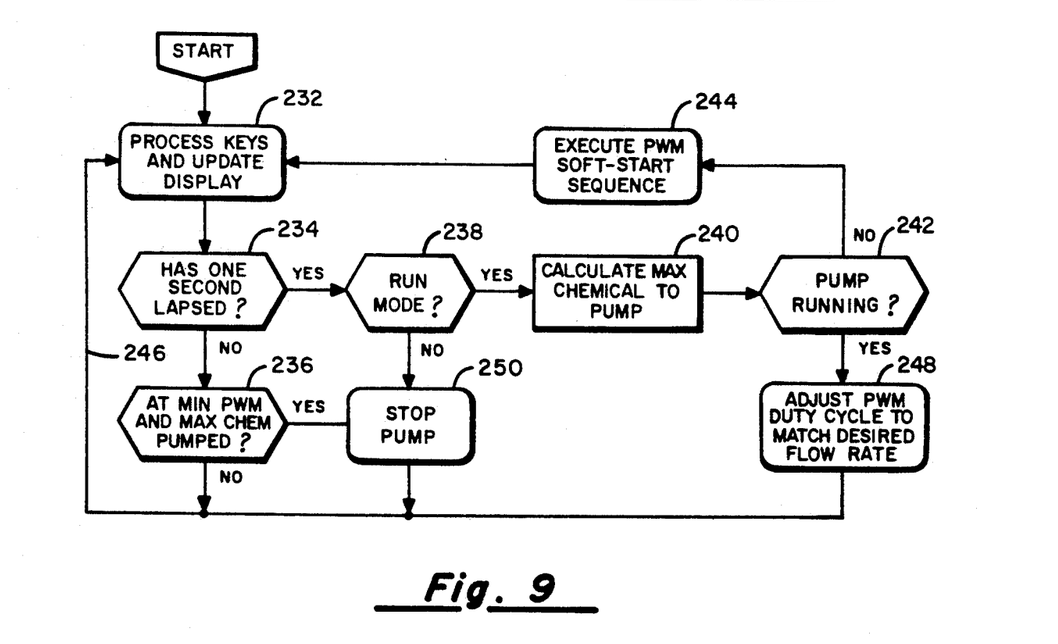
FIG. 9 is a software flow diagram depicting the algorithm employed in controlling the pump motor.

Having explained the details of construction of the system of the present invention and its mode of calibration, consideration will next be given to its mode of operation and, in this regard, special attention is directed to the manner in which the microprocessor 86 functions to adjust the speed of the DC motor 80 to continually maintain the desired percentage of foam/water mixture exiting the nozzle 78. The software flow diagram of FIG. 9 depicts the software algorithm of the program stored in the ROM memory 92 of the microprocessor-based controller illustrated in FIG. 5. Approximately every 25 milliseconds, the microprocessor 86 senses the state of the push-button switches 32, 34, 36 and 38 and updates and refreshes the five-digit, seven-segment display 30 (block 232) and then an internal timer in the microprocessor is sensed to determine if an arbitrarily set time period, e.g., one second, has elapsed (block 234). If not, a test is made to determine if the motor should be operated in the burst mode where the minimum duty cycle (30 percent) PWM signal is to be turned on and off in controlling the low volume injection of foamant into the water stream (block 236). The test made at block 236 is to determine if the motor controller is operating at the 30 percent duty cycle PWM at the same time that the maximum chemical foamant is being pumped in matching the preset percentage concentration of foam to water. If not, control loops back to block 232 and the same routine is repeated many times until the one second time interval has been found to have elapsed.

At one second intervals, then, a test is made to determine if the system is in its "RUN" mode (block 238). To be in the "RUN" mode, the flow meter 15 must be indicating that water is flowing through the manifold 14 and the float sensor 52 in the foam tank 50 must be indicating that there is foam concentrate in the tank. If these conditions are both met, the microprocessor calculates the maximum amount of foam concentrate that must be added to the then existing water flow rate to meet the previously entered percentage concentration target (block 240).

Next, a test is made by sensing the speed sensor 56, 58 to determine if the pump is running (block 242). If not, the PWM soft-start sequence is executed (block 244). As mentioned earlier in the specification, to prevent inordinately high motor starting currents, the microprocessor issues a PWM drive control to the motor driver MOSFETS (FIG. 7) so that the minimum (30 percent) duty cycle is used. Control then returns to block 232 and the loop including blocks 232, 234, 236 and the return path 246 is repeated until the one second timer is again satisfied.

Assuming that the system remains in the RUN mode, the calculation called for block 240 is again carried out and, assuming further that the pump is running (block 242), the duty cycle of the PWM signal is adjusted by the microprocessor to adjust pump speed to match the desired foam concentrate flow rate needed to achieve the preset water/concentrate mixture percentage (block 248). Again, control returns, via path 245, to the point where the pushbuttons are polled and the display is updated (block 232).

This operation continues until such time that decision block 238 determines that the RUN mode has terminated, usually by the fire-fighter turning off the nozzle valve 78 (FIG. 1). In this event, the pump is stopped (block 250).

If at any time during the RUN mode that the measured water flow rate drops to the point where the chemical foamant being pumped must be reduced below that which can be sustained using the minimum PWM (see FIG. 4), the test represented by decision block 236 will be affirmative and the motor will be stopped. The software depicted by the flow diagram of FIG. 9 will continue to be executed by the microprocessor and, again, when the one second interval has elapsed, control will enter will RUN mode test (block 238) and since it is still active, the calculation called for block 240 will be carried out. Under the assumed conditions that the motor stopped due to the fact that the flow of water was low and the PWM control alone could not cause the pump to be driven slowly enough, the "PUMP RUNNING? " test will be negative (block 242) and the PWM soft-start sequence (block 244) will again execute to restart the motor.

It can be seen then, that under low water flow conditions, the pump will be driven ON intermittently, at one second intervals, for a calculated length of time less than one second, thereby allowing it to inject foamant at a much lower rate of flow than can be achieved using PWM control alone.

OPTIONAL ENHANCEMENT

When a liquid chemical foamant is added to the fire-fighting water stream, it is possible to enhance the performance of the system in terms of the ability to project the mixture a substantially greater distance beyond the nozzle end of the hose by injecting compressed air into the hose upstream of the nozzle. However, a problem arises should the compressed air be turned on at a time that the water stream is not being foamed. As air is injected, water is concentrated in the low areas and air in the upper areas of the hose distribution over a rough terrain. When the fire nozzle is opened, the water will be pushed out in high velocity slugs which when hitting the nozzle may tear the hose out of the operator's hands.

Figure 10:
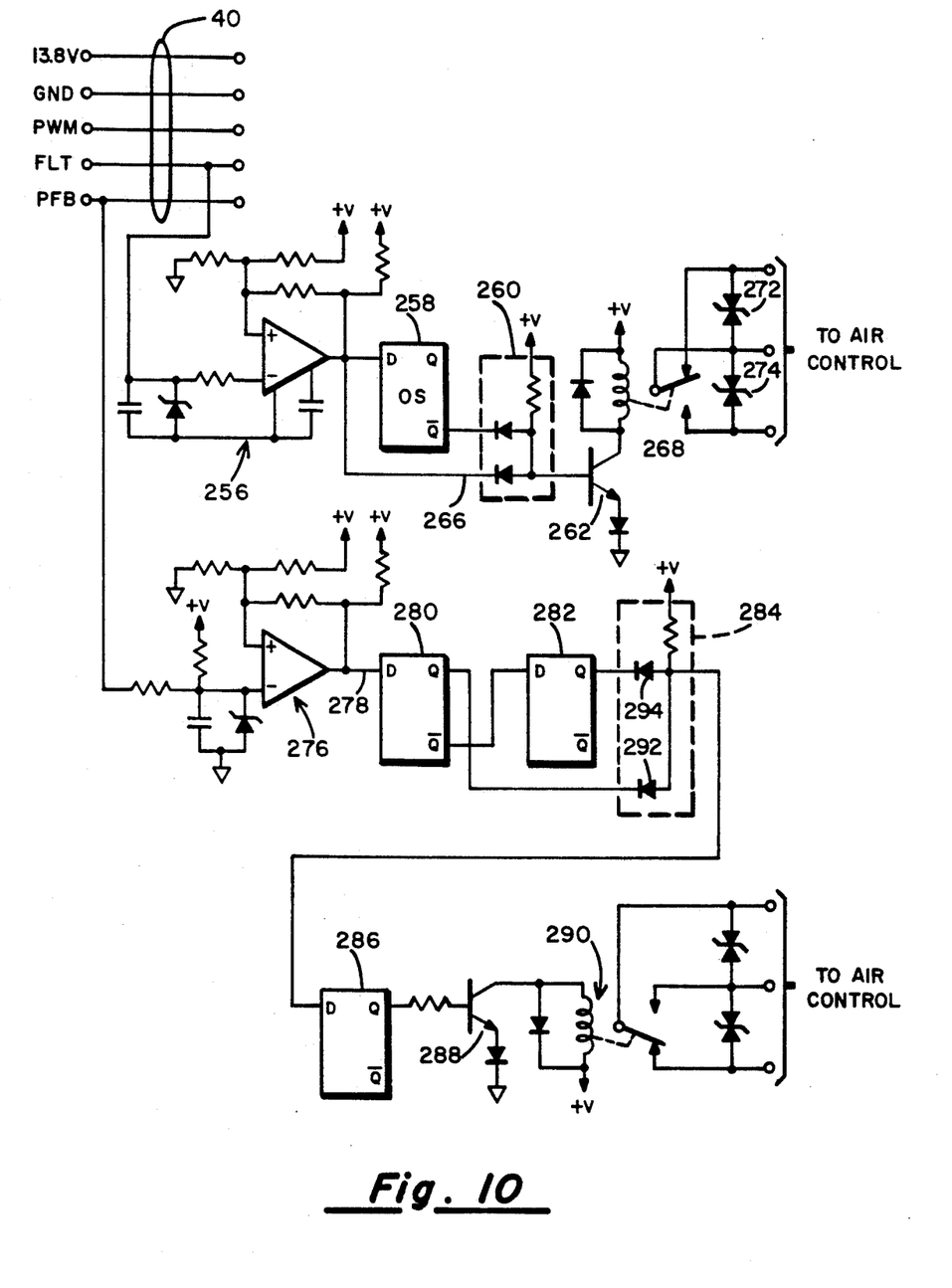
FIG. 10 is a schematic diagram illustrating the circuitry for implementing the compressed air control module.

In the event that the system of the present is to be used in combination with the injection of compressed air, provision is made for an interlock which will prevent the air compressor from running if and when no foam is being injected into the water stream. This is the function performed by the compressed air control module 41 that is coupled into the cable 40 joining the controller/display module 26 with the motor driver 42. Basically, this module senses whether there is adequate foam concentrate in the tank 50, as sensed by the float sensor 52, and whether the pump 62 is running. If either one of these conditions is not satisfied, the air compressor (43) is shut off. FIG. 10 is a schematic diagram illustrating the circuitry for implementing the compressed air control module 41. The device is arranged "eaves-drop" on the float (FLT) signal and the pump feedback (PFB) signal transferred over the conductors 252 and 254 in the cable 40.

The signal on the conductor 252 is brought into a receiver circuit 256 which is configured substantially identically to the other receiver circuits already explained and illustrated in FIGS. 6 and 8. It functions to match the analog float signal to a downstream digital device, in this instance, the one-shot circuit 258. The compliment output of the one-shot 258 is diode ANDed with the output from the receiver circuit 256 by the diode AND circuit 260. Hence, if at the time that the one-shot circuit 58 times out and the compliment output goes high, the relay driver transistor 262 will be turned on, provided the output from the receiver circuit 256 is simultaneously high. The period of instability of the one-shot is set to be about five seconds. Hence, if the float switch 52 is about at its low or trigger level, the output of the receiver circuit 256 will go high to trigger the one-shot 258 which causes the complimentary output on line 264 to go low. The signal out of the receiver 256 on line 266 will be high. Thus, the transistor 262 will not be turned on unless the signal on line 266 is high when the one-shot times out. This insures that the float switch in the tank is, indeed, firmly indicating a low foam level and is not a momentary dip due to sloshing of the liquid in the tank which might momentarily cause the receiver 256 to output a signal.

When the transistor 262 turns on, the relay 268 pulls in to reverse the position of the single-pole, double-throw contacts 270. The relay contacts are connected in controlling relationship to the air compressor and its associated power supply, neither of which is illustrated. The Zenar diodes 272 and 274 function as transient protectors to prevent arcing of the contacts when inductive loads are involved.

The pump feedback signal PFB is also examined. This signal is only present when and if the pump is being driven in that it is derived from the speed sensor 56, 58. The signal on line 254 is appropriately shaped by the receiver circuit 276 whose output on line 278 is applied to the trigger input of a retriggerable one-shot circuit 280. The complimentary output of the one-shot 280 is applied to the trigger input of a further one-shot circuit 282. The true output of one-shot 280 and that of one-shot 282 are diode ANDed by circuit 284 and the output of that circuit is applied as a trigger input to a third retriggerable one-shot circuit 286. The true output of one-shot 286 controls the conduction of the relay driver transistor 288. Since it is an NPN transistor, its base electrode must be high for it to be driven into its conductive state for actuating the relay 290.

It will be recalled when the system is running in the BURST mode, PWM signals for driving the pump occur for a fraction of a second during each one second interval. Hence, the air compressor 43 should not be shut off just because the motor has intermittently stopped because it is operating in the BURST mode. When a first BURST width modulated pulse comes through to rotate the pump, the PFB signal will trigger the one shot 280, causing the input to the diode 292 to go high for a time interval of about three seconds. The complimentary output from one shot 280 will, at the same time, trigger the one shot 282 so that the input to the diode 294 will also go high. The meta-stable period for one-shot 282 is set to be three seconds. Only when both one shots 280 and 282 are active will the output from AND gate 284 go high to trigger the one shot 286. Thus, so long as the bursts are occurring at their one second intervals, the AND condition for gate 284 will be satisfied and the transistor 288 will remain on. If, on the other hand, the pump should lock up so that its shaft does not move, both one shots 280 and 282 will ultimately time out, causing gate 284 to output a low signal to remove the trigger of one shot 286, thereby reversing the relay contacts 290 and shutting off the air compressor 43.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a fire system of the type including a water supply means for normally delivering water at varying flow rates through a hose member, means for monitoring the flow of water through said hose member and producing an electrical signal related to the rate of water flow through said hose member, a supply tank for containing a supply of a liquid chemical foamant, positive displacement pump means having an input port coupled to said supply tank, an output port coupled to said hose member and pump speed sensing means for sensing the speed at which said pump is being driven, a variable speed electrical motor for driving said pump means at a speed determined by a control signal applied thereto, computing means coupled to receive said electrical signal relating to flow and a signal from said pump speed sensing means, said computing means determining the speed at which said motor should be driven to introduce a metered quantity of said chemical foamant into said hose member, depending on the rate of flow of water through said hose member, the improvement comprising:
(a) motor drive means coupled to said computing means for generating said control signal for said drive motor, said motor drive means producing a pulse width modulated signal of a predetermined frequency whose duty cycle is determined by said computing means for varying the speed of said drive motor between a maximum and a lower intermediate speed; and
(b) burst width modulating means for turning said pulse width modulated signal on and off at predetermined time intervals determined by said computing means for varying the speed of said drive motor between said lower intermediate speed and a predetermined minimum speed whereby the flow rate of said liquid concentrate into said hose member is controllable over an extended range.

2. The fire extinguishing system as in claim 1 and further including:
(a) level sensing means for sensing the level of chemical foamant in said supply tank and providing a signal to said computing means for disabling said motor drive means following the fall of said chemical foamant in said supply tank below a predetermined level.

3. The fire extinguishing system as in claim 2 and further including:
(a) air compressor means for injecting compressed air into said hose member; and
(b) interlock circuit means operatively coupled between said computing means and said motor drive means to detect the presence and absence of said signal from said pump speed sensing means and said signal from said level sensing means for controlling the on/off state of said air compressor.

4. The fire extinguishing system as in claim 3 wherein said interlock circuit means puts said air compressor in said off state when either said signal from said pump speed sensing means or said signal from said level sensing means is absent.

5. The fire extinguishing system as in claim 1 and further including display means coupled to said computing means for visually indicating any one of the current flow of water and chemical foamant per minute, the total amount of water and chemical foamant pumped, the chemical foamant injection rate setting in the percent mode and total amount of chemical foamant pumped.

6. The fire extinguishing system as in claim 5 and further including non-volatile RAM memory means operatively coupled to said computing means and manually operable switch means coupled to said computing means for entering operating information into said RAM memory means.

7. The fire extinguishing system as in claim 6 wherein said operating information includes calibration parameters relating to a known quantity of chemical foamant pumped from said supply tank to a displayed quantity on said display means.

8. The fire extinguishing system as in claim 1 wherein said predetermined frequency is 476 Hz and said duty cycle varies between 100 percent and about 30 percent to 35 percent in establishing said maximum and lower intermediate speeds.

9. The fire extinguishing system as in claim 8 wherein said burst width modulating means provides a burst on-time to an off-time ratio varying between 100 percent and about five percent.

10. The fire extinguishing system as in claim 9 wherein said hose member is of a sufficient length to ensure complete mixing of said chemical foamant with said water when said pump means is driven intermittently by said motor.

* * * * *

UNITED STATES PATENT AND TRADEMARK OFFICE
CERTIFICATE OF CORRECTION

PATENT NO. : 5,232,052
DATED : August 3, 1993
INVENTOR(S) : Lawrence C. Arvidson, et al.

It is certified that error appears in the above-identified patent and that said Letters Patent is hereby corrected as shown below:

Column 13, line 24, the phrase

"In a fire system"

should read

-- In a fire extinguishing system --

Signed and Sealed this

Fifth Day of April, 1994

BRUCE LEHMAN

Attest:

Attesting Officer

Commissioner of Patents and Trademarks